(12) United States Patent
Hita et al.

(10) Patent No.: US 10,364,547 B2
(45) Date of Patent: Jul. 30, 2019

(54) HYBRID WORK MACHINE

(71) Applicant: Hitachi Construction Machinery Co., Ltd., Taito-ku, Tokyo (JP)

(72) Inventors: Masafumi Hita, Ibaraki (JP); Shinya Imura, Ibaraki (JP); Hidekazu Moriki, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/754,122

(22) PCT Filed: Jan. 11, 2017

(86) PCT No.: PCT/JP2017/000689
§ 371 (c)(1),
(2) Date: Feb. 21, 2018

(87) PCT Pub. No.: WO2017/149939
PCT Pub. Date: Sep. 8, 2017

(65) Prior Publication Data
US 2018/0282968 A1    Oct. 4, 2018

(30) Foreign Application Priority Data

Feb. 29, 2016    (JP) .................................. 2016-038250

(51) Int. Cl.
*B60W 20/00* (2016.01)
*E02F 3/43* (2006.01)
(Continued)

(52) U.S. Cl.
CPC ................ *E02F 3/435* (2013.01); *B60L 1/00* (2013.01); *B60L 3/00* (2013.01); *B60L 50/16* (2019.02);
(Continued)

(58) Field of Classification Search
CPC ...... B60W 20/00; B60W 20/50; B60W 20/15; E02F 3/435
See application file for complete search history.

(56) References Cited

U.S. PATENT DOCUMENTS 6,820,356 B2 * 11/2004 Naruse ................. E02F 9/2221
  37/348
9,022,749 B2 *  5/2015 Akiyama ................ E02F 9/123
  417/212
(Continued)

FOREIGN PATENT DOCUMENTS

JP    2001-3396 A    1/2001
JP    2003-239902 A  8/2003
(Continued)

OTHER PUBLICATIONS

International Search Report (PCT/ISA/210) issued in PCT Application No. PCT/JP2017/000689 dated Mar. 28, 2017 with English translation (Four (4) pages).
(Continued)

*Primary Examiner* — James A Shriver, II
*Assistant Examiner* — James J Triggs
(74) *Attorney, Agent, or Firm* — Crowell & Moring LLP

(57) ABSTRACT

The lifetime of an electrical storage device is prolonged by reducing a speed of at least relevant one of hydraulic actuators for a specific operation to be performed by a work machine. This hybrid work machine includes a limit control section. When at least one specific operation defined as predetermined one or more among a plurality of work operations performed by the hybrid work machine is performed under condition of a degree of tendency to deterioration of the electrical storage device becoming higher, the limit control section reduces a speed of at least relevant one of the hydraulic actuators at a rate preset for the specific
(Continued)

operation depending on the degree of tendency to deterioration of the electrical storage device.

5 Claims, 13 Drawing Sheets

(51) Int. Cl.
*B60L 1/00* (2006.01)
*B60L 3/00* (2019.01)
*B60W 10/08* (2006.01)
*B60W 10/26* (2006.01)
*B60W 20/13* (2016.01)
*E02F 3/42* (2006.01)
*E02F 9/20* (2006.01)
*E02F 9/22* (2006.01)
*B60L 50/16* (2019.01)
*E02F 3/32* (2006.01)

(52) U.S. Cl.
CPC ............ *B60W 10/08* (2013.01); *B60W 10/26* (2013.01); *B60W 20/00* (2013.01); *B60W 20/13* (2016.01); *E02F 3/425* (2013.01); *E02F 9/2091* (2013.01); *E02F 9/2203* (2013.01); *B60W 2300/17* (2013.01); *B60W 2710/30* (2013.01); *E02F 3/32* (2013.01); *E02F 9/2004* (2013.01); *E02F 9/2075* (2013.01); *E02F 9/2271* (2013.01); *Y02T 10/7077* (2013.01)

(56) References Cited

U.S. PATENT DOCUMENTS

| 9,340,953 | B2* | 5/2016 | Sakamoto | ............... B60K 6/485 |
| 9,822,510 | B2* | 11/2017 | Sakamoto | ............... E02F 9/2075 |
| 2015/0337521 | A1 | 11/2015 | Sakamoto et al. | |

FOREIGN PATENT DOCUMENTS

| JP | 2004-11256 A | 1/2004 |
| JP | 2005-83242 A | 3/2005 |
| JP | 2011-47317 A | 3/2011 |
| JP | 2014-148879 A | 8/2014 |
| JP | 2014-185963 A | 10/2014 |
| WO | WO 2015/114909 A1 | 8/2015 |
| WO | WO 2013/191205 A1 | 5/2016 |

OTHER PUBLICATIONS

Japanese-language Written Opinion (PCT/ISA/237) issued in PCT Application No. PCT/JP2017/000689 dated Mar. 28, 2017 (Four (4) pages).

* cited by examiner

US 10,364,547 B2

HYBRID WORK MACHINE

TECHNICAL FIELD

The present invention relates to a hybrid work machine.

BACKGROUND ART

There is known a hybrid work machine including a generator motor (motor generator) that is mechanically coupled to both an engine and a hydraulic pump, and an electrical storage device (electrical storage means) such as a lithium ion battery or a capacitor (see, e.g., Patent Literature (PTL) 1). In the work machine disclosed in PTL 1, the hydraulic pump is driven by the engine and the generator motor. When a hydraulic oil delivered from the hydraulic pump is supplied to actuators such as hydraulic cylinders and hydraulic motors, a boom, an arm, a bucket, an upperstructure, etc. are driven.

PTL 1 discloses a technique of limiting a powering torque value depending on a residual charge amount (charge rate), and controlling the generator motor to output the limited powering torque value, when the residual charge amount is not more than a predetermined value set in advance. PTL 1 further discloses that, when the residual charge amount is reduced, a maximum value of input torque to the hydraulic pump is controlled such that output power of the hydraulic pump is held constant.

CITATION LIST

Patent Literature

PTL 1: Japanese Unexamined Patent Application Publication No. 2005-083242

SUMMARY OF INVENTION

Technical Problem

In the technique disclosed in above PTL 1, however, no considerations are paid to a variety of work operations of the work machine.

Solution to Problem

An embodiment of the present invention provides a hybrid work machine including an engine, a generator motor driven by the engine, an electrical storage device that supplies and receives electric power to and from the generator motor, a hydraulic pump driven by the engine and the generator motor, hydraulic actuators driven by a hydraulic oil delivered from the hydraulic pump, and operating members used to operate the hydraulic actuators, wherein the hybrid work machine includes a limit control section, and when at least one specific operation defined as predetermined one or more among a plurality of work operations performed by the hybrid work machine is performed under condition of a degree of tendency to deterioration of the electrical storage device becoming higher, the limit control section reduces a speed of at least relevant one of the hydraulic actuators at a rate preset for the specific operation depending on the degree of tendency to deterioration of the electrical storage device.

Advantageous Effects of Invention

According to the present invention, the lifetime of the electrical storage device can be prolonged by reducing the speed of at least relevant one of the hydraulic actuators for the specific operation to be performed by the work machine.

DESCRIPTION OF EMBODIMENTS

One embodiment of a hybrid work machine according to the present invention will be described below with reference to the drawings.

Figure 1:
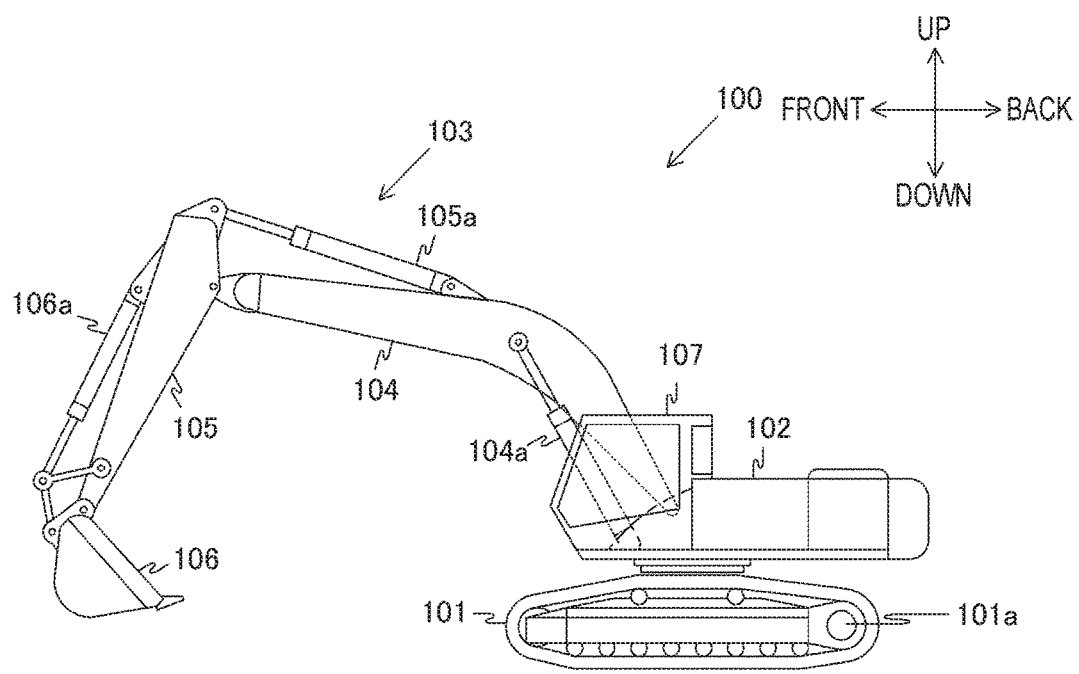
FIG. 1 is a side view of a hybrid hydraulic excavator as one example of a hybrid work machine according to an embodiment.

FIG. 1 is a side view of a hybrid hydraulic excavator as one example of the hybrid work machine according to the embodiment. For convenience of explanation, front-back and up-down directions are defined as per illustrated in FIG. 1. The hybrid hydraulic excavator performs a variety of operations with various actuators driven by hydraulic oil (pressure oil) that is delivered from a hydraulic pump.

As illustrated in FIG. 1, the hybrid hydraulic excavator (simply called a "hydraulic excavator 100" hereinafter) includes a traveling body 101, and an upperstructure 102 mounted on the traveling body 101 to be swingable relative to the traveling body 101. The traveling body 101 travels with a pair of right and left crawlers driven by a traveling hydraulic motor 101a. The upperstructure 102 is driven by total torque of a swing hydraulic motor 102a (see FIG. 2) and a swing electric motor 124b (see FIG. 2).

A cab 107 is provided in a front portion of the upperstructure 102 on the left side, and an engine room is formed behind the cab 107. An engine, hydraulic equipment, and so on, which serve as motive power sources, are installed in the engine room. A counterweight for keeping a balance of a machine body during work is attached to the back side of the engine room. In the cab 107, there are installed a driver seat on which an operator sits, operating members (not illustrated) corresponding to respective operations of a boom 104, an arm 105, a bucket 106, the upperstructure 102, and the traveling body 101, and engine control dials (not illustrated) used to instruct a target rotational speed of an engine 121b (see FIG. 2).

A front working device 103 is mounted to a front portion of the upperstructure 102 on the right side. The front working device 103 is a working device of an articulated structure including a plurality of front members, i.e., the boom 104, the arm 105, and the bucket 106. The boom 104 is rotatably mounted at its base end to the upperstructure 102. The arm 105 is rotatably mounted at its one end to a fore end of the boom 104. The boom 104 and the arm 105 are driven respectively by a boom cylinder 104a and an arm cylinder 105a, which are hydraulic actuators, to pivotally rotate up and down. The bucket 106 is mounted to a fore end of the arm 105 to be rotatable in the up-down direction relative to the arm 105, and is driven by a bucket cylinder 106a that is a hydraulic actuator.

Figure 2:
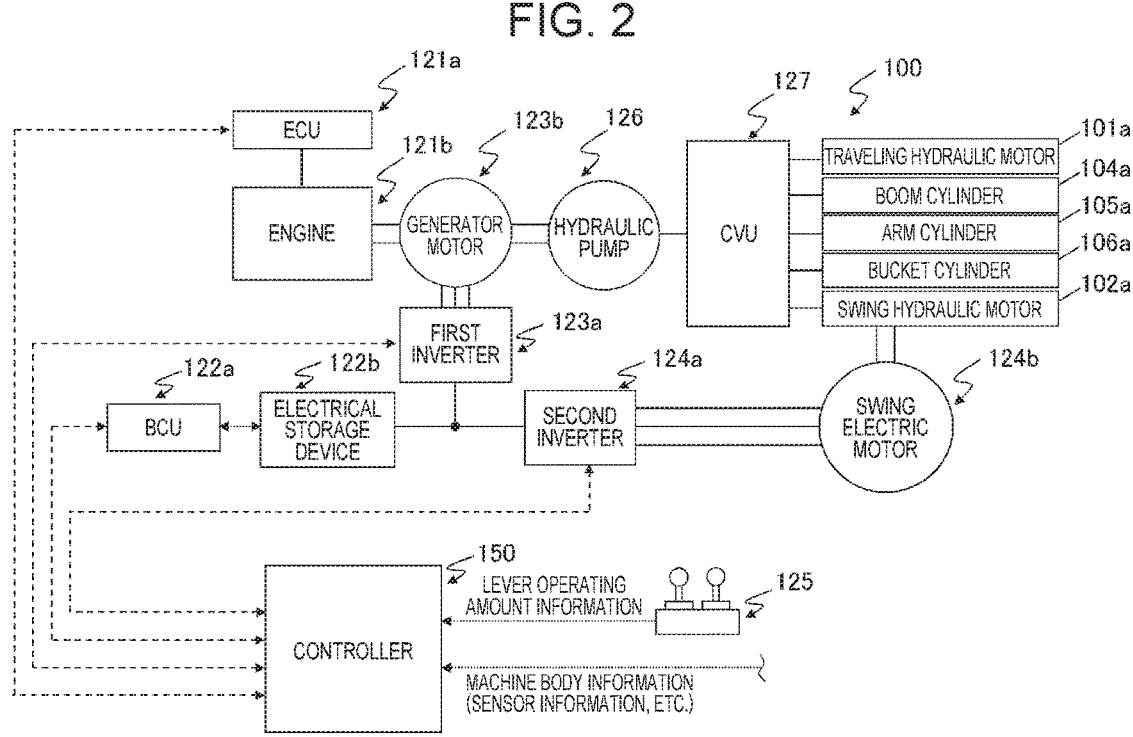
FIG. 2 illustrates a system configuration of the hydraulic excavator as one example of the hybrid work machine.

FIG. 2 illustrates a system configuration of the hydraulic excavator 100. The hydraulic excavator 100 includes a controller 150 that controls various components of the hydraulic excavator 100, an engine control unit (called an "ECU 121a" hereinafter) that controls the engine 121b, and a battery control unit (called a "BCU 122a" hereinafter) that controls the electrical storage device 122b. Each of the controller 150, the ECU 121a, and the BCU 122a includes an arithmetic processing unit constituted by a CPU, storages given as a ROM and a RAM, other peripheral circuits, etc.

The hydraulic excavator 100 includes the engine 121b, a generator motor 123b, and a first inverter 123a. The engine 121b and the generator motor 123b are mechanically coupled to each other and are rotated at the same rotational speed.

The hydraulic excavator 100 further includes the hydraulic pump 126 and a control valve unit (CVU) 127. The hydraulic pump 126 is mechanically coupled to the generator motor 123b and is driven by the engine 121b and the generator motor 123b to deliver the hydraulic oil. The hydraulic oil delivered from the hydraulic pump 126 is distributed by the control valve unit 127 in accordance with operating actions performed by an operator (worker) on the various operating members. The distributed hydraulic oils (pressure oils) are supplied to the traveling hydraulic motor 101a, the boom cylinder 104a, the arm cylinder 105a, the bucket cylinder 106a, and the swing hydraulic motor 102a, whereby those hydraulic actuators are driven.

The hydraulic excavator 100 still further includes the swing electric motor 124b, a second inverter 124a, and the electrical storage device 122b. The electrical storage device 122b is a lithium ion battery unit including, as charge storage elements, a plurality of lithium ion batteries each having a voltage of 350 [V], a discharge capacity of 5 [Ah], and an adequate use range of 30 to 70 [%] for the charge rate (residual charge). Charging to and discharging from the electrical storage device 122b is controlled by the BCU 122a.

The first inverter 123a is an electric power conversion device that converts DC power to AC power and outputs the AC power to the generator motor 123b, or that converts AC power generated by the generator motor 123b to DC power. Similarly, the second inverter 124a is an electric power conversion device that converts DC power to AC power and outputs the AC power to the swing electric motor 124b, or that converts AC power generated by the swing electric motor 124b to DC power.

The electrical storage device 122b, the first inverter 123a, and the second inverter 124a are interconnected by DC paths, and electric power is transferred among them. A booster, such as a DC-DC converter, may be disposed between the electrical storage device 122b and the DC path.

Input and output waveforms for the generator motor 123b are controlled by the first inverter 123a. The generator motor 123b functions as a generator that is rotationally driven by the engine 121b, and that generates three-phase AC power. The AC power generated by the generator motor 123b is converted to DC power by the first inverter 123a and is charged into the electrical storage device 122b. Furthermore, the generator motor 123b functions as an electric motor driven by the three-phase AC power, which has been converted by the first inverter 123a, to generate rotational torque. When the generator motor 123b is in a powering mode in which it is driven as the electric motor, the engine 121b is assisted by the electric motor, and the hydraulic pump 126 is driven by both the engine 121b and the generator motor 123b.

Input and output waveforms for the swing electric motor 124b are controlled by the second inverter 124a. The swing electric motor 124b functions as a generator that generates three-phase AC power when the upperstructure 102 is in a swing braking mode. The AC power generated by the swing electric motor 124b is converted to DC power by the second inverter 124a and is charged into the electrical storage device 122b. Thus, the swing electric motor 124b performs a regenerative operation to electrically recover hydraulic energy when the upperstructure 102 is in the swing braking mode. Furthermore, the swing electric motor 124b functions as an electric motor driven by the three-phase AC power, which has been converted by the second inverter 124a, to generate rotational torque. When the swing electric motor 124b is in a powering mode in which it is driven as the electric motor, the upperstructure 102 is driven by both the swing electric motor 124b and the swing hydraulic motor 102a.

A powering operation of one of the generator motor 123b and the swing electric motor 124b is performed by not only the electric power supplied from the electrical storage device 122b, but also the electric power generated by the other of the generator motor 123b and the swing electric motor 124b and supplied directly without interposition of the electrical storage device 122b in some cases.

The controller 150 receives machine body information, such as a load of the hydraulic pump 126 and mode information, from various sensors and switches each installed on or in the machine body, and controls an overall system of the machine body while communicating with the ECU 121a, the BCU 122a, the first inverter 123a, and the second inverter 124a.

From the viewpoint of reducing fuel consumption, a smaller-sized engine is selected as the engine 121b; namely maximum output power of the engine 121b is smaller than a maximum absorption power of the hydraulic pump 126. When the smaller-sized engine 121b is used, an engine assist rate with the powering operation of the generator motor 123b operating as the electric motor is greater than that in the case of using a larger-sized engine with output power much greater than the maximum pump absorption power. In the hydraulic excavator including the smaller-sized engine, therefore, the electrical storage device 122b more frequently repeats charging and discharging than in the hydraulic excavator including the larger-sized engine.

The hydraulic excavator 100 performs, for example, "earth loading work" of loading gravels and soils onto a dump truck. The earth loading work is performed in sequence of [1] excavating operation, [2] swing and boom-up operation, [3] dumping operation, [4] swing return operation, [1] excavating operation, and so on. Thus, the earth loading work is sequential cyclic work that includes, as one cycle, a series of work operations from [1] excavating operation to [4] swing return operation, and that repeats the above series of work operations. The excavating operation is a work operation of excavating earth, in which a crowding operation of the arm 105 and a crowding operation of the bucket 106 are performed at the same time. The swing and boom-up operation is a work operation in which the upperstructure 102 is swung to move the bucket 106 to a position just above a rear deck of the dump truck (i.e., a dumping work position) while holding the earth loaded in the bucket 106, and in which a swing operation of the upperstructure 102 and an operation of raising the boom 104 are performed at the same time. The dumping operation is a work operation in which the earth in the bucket 106 is released onto the rear deck of the dump truck, and in which a dumping operation of the arm 105 and a dumping operation of the bucket 106 are performed at the same time. The swing return operation is a work operation in which the upperstructure 102 is swung to an excavation work position, and in which the swing operation of the upperstructure 102 is performed solely.

Among the series of work operations, the excavating operation and the swing and boom-up operation are high-load operations in which a load is higher than in low-load operations such as the dumping operation and the swing return operation. Here, the excavating operation and the swing and boom-up operation are the high-load operations that need assistance (aid) of the generator motor 123b with electric power supplied from the electrical storage device 122b, whereas the dumping operation and the swing return operation are the low-load operations in which the generator motor 123b can generate electric power with extra output power of the engine 121b. In the above sequential cyclic work, an average discharge amount from the electrical storage device 122b becomes greater than an average charge amount into the electrical storage device 122b in some cases depending on a maximum output power balance between the engine 121b constituting the system and the generator motor 123b functioning as the assist motor, and on a balance of the operator's operating action during the sequential cyclic work. When the sequential cyclic work is continuously performed in such a situation, the charge rate of the electrical storage device 122b reduces gradually. In general, the electrical storage device 122b has characteristics that the output performance of the electrical storage device 122b degrades significantly due to over-discharge.

In this embodiment, as described above, the lithium ion battery unit in which the adequate use range for the charge rate (called the "adequate use range" hereinafter) is 30 to 70 [%] is employed as the electrical storage device 122b. Accordingly, when charging and discharging are made on the electrical storage device 122b in a state of the charge rate being lower than the adequate use range or a state of the charge rate being higher than the adequate use range, a deterioration rate of the electrical storage device 122b increases significantly in comparison with the case of the charge rate being within the adequate use range.

Taking into account the above point, in this embodiment, when it is expected that the charge rate of the electrical storage device 122b is going to be lower than the adequate use range, the output power of the generator motor 123b is limited before the charge rate departs from the adequate use range, thereby prolonging the lifetime of the electrical storage device 122b.

In this embodiment, the controller 150 detects the charge rate of the electrical storage device 122b, the charge rate being one of parameters representing a degree of tendency to deterioration of the electrical storage device 122b. When the charge rate of the electrical storage device 122b reduces to near a predetermined lower limit value of the adequate use range, the discharge amount of the electrical storage device 122b is reduced by reducing the output power (motive power) of the generator motor 123b. When the output power of the generator motor 123b is reduced, driving torque of the hydraulic pump 126 decreases and operation speeds of the hydraulic actuators operated with control levers 111 and 112 lower. Here, "the charge rate of the electrical storage device 122b becomes lower than the lower limit value" is equivalent to "the degree of tendency to deterioration of the electrical storage device 122b becomes higher than an upper limit value".

The discharge amount of the electrical storage device 122b can be efficiently reduced by reducing the output power of the generator motor 123b in the sequential cyclic work. However, if the same output limit value (upper limit value) is set for all of the work operations, i.e., the excavating operation, the swing and boom-up operation, the dumping operation, and the swing return operation, in the sequential cyclic work as a method of reducing the output power of the generator motor 123b, that method raises a problem of causing a difference among speed reduction amounts of the individual hydraulic actuators at timing of transition from the operation before output limitation to the operation after the output limitation.

The difference in the actuator speed between before the output limitation and after the output limitation is large, for example, in the swing and boom-up operation that is the work operation subjected to a maximum load among the various work operations in the earth loading work. On the other hand, the difference in the actuator speed between before the output limitation and after the output limitation is small in the excavating operation that is the work operation subjected to a lower load than that in the swing and boom-up operation. Therefore, when the output limitation is performed, the operator feels that the actuator speed in the swing and boom-up operation is significantly lowered, but feels that the actuator speed in the excavating operation is hardly changed between before the output limitation and after the output limitation. Thus, the above-described output reducing method (speed reducing method) has a possibility of causing the operator to feel strongly odd in operating the hydraulic excavator.

Furthermore, when the output limit value (upper limit value) is reduced depending on the reduction of the charge rate, only the swing and boom-up operation is first limited corresponding to certain reduction of the charge rate, and the excavating operation is then limited at timing of further reduction of the charge rate. Accordingly, it is difficult for the operator to recognize what type of operation is limited in speed at what timing. This also raises a possibility of causing the operator to feel strongly odd in operating the hydraulic excavator.

In this embodiment, the controller 150 determines whether at least one predetermined work operation (called a "specific operation") among a plurality of work operations performed by the hydraulic excavator 100 is performed. When the charge rate of the electrical storage device 122b is reduced beyond the lower limit value and when the specific operation is performed, the controller 150 executes limit control to reduce the speed of at least relevant one of the hydraulic actuators at a rate preset for the specific operation depending on the charge rate of the electrical storage device 122b. As a result, the lifetime of the electrical storage device 122b can be prolonged, and an odd feeling given to the operator in operating the hydraulic excavator can be reduced. The above point will be described in more detail below in connection with the earth loading work, for example.

In this embodiment, depending on the reduction of the charge rate of the electrical storage device 122b, output reduction is performed on the swing and boom-up operation and the excavating operation, which are each the high-load operation selected as the specific operation, such that a speed reduction rate relative to a regular working speed (actuator speed) is the same. Thus, when the working speed is reduced to 70% relative to the regular working speed (100%) in the swing and boom-up operation, the working speed in the excavating operation is also reduced to 70% relative to the regular working speed (100%). As a result, the operator can be made feel less odd in operating the hydraulic excavator when the different specific operations are performed.

Figure 3:
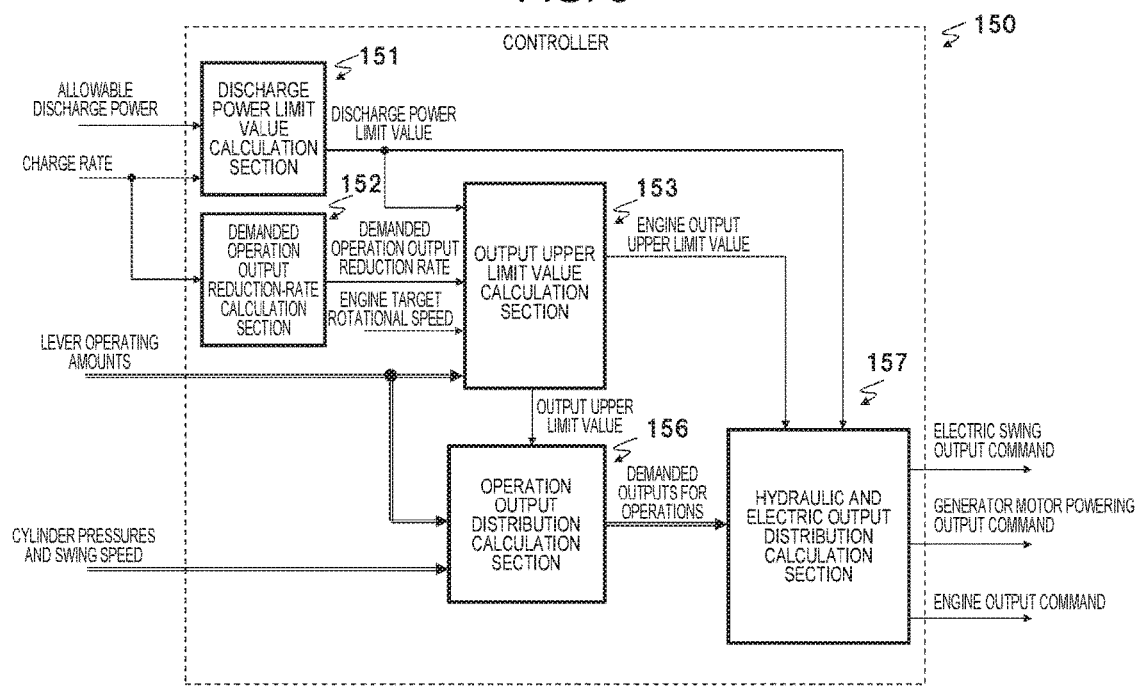
FIG. 3 is a functional block diagram of a controller.

FIG. 3 is a functional block diagram of the controller 150.

FIG. 3 illustrates a control process when the excavating operation and the swing and boom-up operation are performed, and when the generator motor 123b and the swing electric motor 124b perform the powering operations. The controller 150 functionally includes a discharge power limit value calculation section 151, a demanded operation output reduction-rate calculation section 152, an output upper limit value calculation section 153, an operation output distribution calculation section 156, and a hydraulic and electric output distribution calculation section 157.

The controller 150 receives information regarding allowable discharge power of the electrical storage device 122b, the charge rate of the electrical storage device 122b, individual lever operating amounts, individual cylinder pressures, and a swing speed. The allowable discharge power and the charge rate are calculated in the BCU 122 and output to the controller 150. The allowable discharge power implies electric power that can be discharged from the electrical storage device 122b at present, and it is calculated from temperatures and voltages of the charge storage elements disposed in the electrical storage device 122b, and from a current upper limit value in terms of hardware. The charge rate (i.e., residual charge amount/capacity) is calculated in estimation by a known method from, for example, terminal voltages of the charge storage elements, which are detected by the BCU 122.

The individual lever operating amounts include the following lever operating amounts (A) to (H) and are detected by the operating amount detection units 125 for the individual levers.

When the control levers are of hydraulic pilot type, the operating amount detection units 125 (see FIG. 2) detect pilot pressures output from pilot valves of the control levers.

Figure 4:
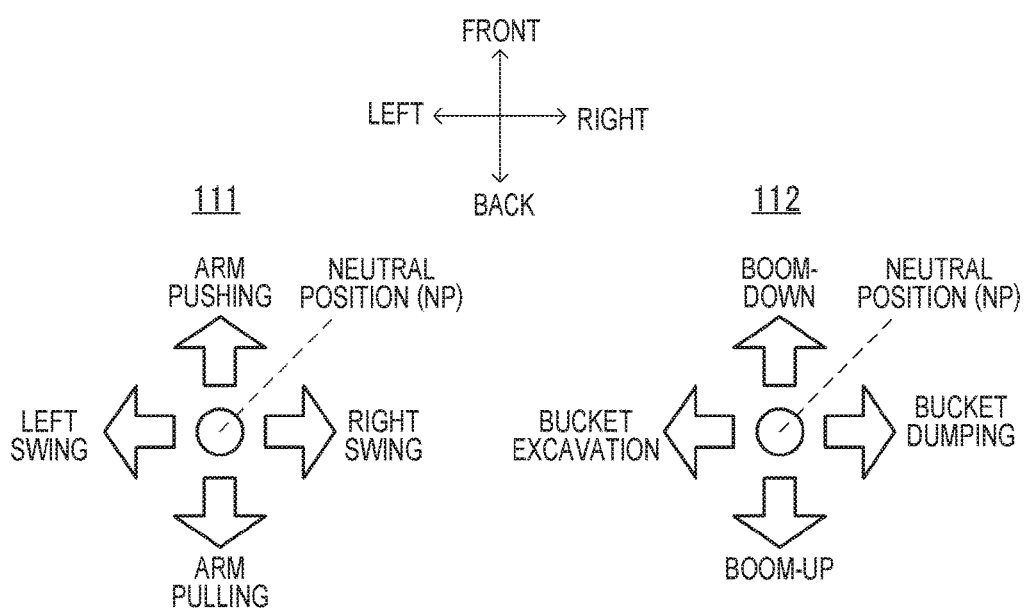
FIG. 4 is an illustration referenced to explain operations of the hydraulic excavator corresponding to operating directions of a left control lever and a right control lever.

(A) An arm-dumping operating amount that is a lever operating amount instructing an arm dumping operation (B) An arm-crowding operating amount that is a lever operating amount instructing an arm crowding operation (C) A left swing operating amount that is a lever operating amount instructing a left swing operation (D) A right swing operating amount that is a lever operating amount instructing a right swing operation (E) A boom-down operating amount that is a lever operating amount instructing a boom-down operation (F) A boom-up operating amount that is a lever operating amount instructing a boom-up operation (G) A bucket-crowding operating amount that is a lever operating amount instructing a bucket crowding operation (H) A bucket-dumping operating amount that is a lever operating amount instructing a bucket dumping operation FIG. 4 is an illustration referenced to explain operations of the hydraulic excavator 100 corresponding to operating directions of a left control lever 111 and a right control lever 112. The left control lever 111 is positioned in the cab on the left side, and the right control lever 112 is positioned in the cab on the right side.

The left control lever 111 is an operating member that operates the arm cylinder 105a, the swing hydraulic motor 102a, and the swing electric motor 124b. In other words, the left control lever 111 is an operating member for performing a rotational operation of the arm 105 relative to the boom 104, and a swing operation of the upperstructure 102. When the left control lever 111 is tilted forward from a neutral position NP, the arm dumping operation (also called an "arm pushing operation") is performed. The arm dumping operation implies an operation that the arm cylinder 105a is contracted and the arm 105 is rotated (clockwise in FIG. 1) at a speed corresponding to the lever operating amount in a direction in which an angle of the arm 105 relative to the boom 104 increases. When the left control lever 111 is tilted backward from the neutral position NP, the arm crowding operation (also called an "arm pulling operation") is performed. The arm crowding operation implies an operation that the arm cylinder 105a is extended and the arm 105 is rotated (counterclockwise in FIG. 1) at a speed corresponding to the lever operating amount in a direction in which the arm 105 is folded toward the boom 104.

When the left control lever 111 is tilted leftward from the neutral position NP, the swing hydraulic motor 102a as one hydraulic actuator and the swing electric motor 124b are driven to perform the left swing operation in which the upperstructure 102 is swung leftward at a speed corresponding to the lever operating amount. When the left control lever 111 is tilted rightward from the neutral position NP, the swing hydraulic motor 102a and the swing electric motor 124b are driven to perform the right swing operation in which the upperstructure 102 is swung rightward at a speed corresponding to the lever operating amount.

The right control lever 112 is an operating member that operates the boom cylinder 104a and the bucket cylinder 106a. In other words, the right control lever 112 is an operating member for performing a rotational operation of the boom 104 relative to the upperstructure 102, and a rotational operation of the bucket 106 relative to the arm 105. When the right control lever 112 is tilted forward from a neutral position NP, the boom-down operation is performed. The boom-down operation implies an operation that the boom cylinder 104a is contracted and the boom 104 is rotated downward at a speed corresponding to the lever operating amount. When the right control lever 112 is tilted backward from the neutral position NP, the boom-up operation is performed. The boom-up operation implies an operation that the boom cylinder 104a is extended and the boom 104 is rotated upward at a speed corresponding to the lever operating amount.

When the right control lever 112 is tilted leftward from the neutral position NP, the bucket crowding operation (also called a "bucket scooping operation") is performed. The bucket crowding operation implies an operation that the bucket cylinder 106a is extended and the bucket 106 is rotated (counterclockwise in FIG. 1) at a speed corresponding to the lever operating amount in a direction in which a claw end (tip end) of the bucket 106 comes closer to a ventral surface of the arm 105. When the right control lever 112 is tilted rightward from the neutral position NP, the bucket dumping operation (also called a "bucket dumping operation") is performed. The bucket dumping operation implies an operation that the bucket cylinder 106a is contracted and the bucket 106 is rotated (clockwise in FIG. 1) at a speed corresponding to the lever operating amount in a direction in which the claw end (tip end) of the bucket 106 moves away from the ventral surface of the arm 105.

When the left control lever 111 is tilted in an oblique direction, for example, to the obliquely forward left, from the neutral position NP, the arm 105 and the upperstructure 102 can be driven in a combined manner. When the right control lever 112 is tilted in an oblique direction, for example, to the obliquely forward left, from the neutral position NP, the boom 104 and the bucket 106 can be driven in a combined manner. Thus, in the hydraulic excavator 100 of this embodiment, four operations at maximum can be performed in a combined manner by operating the left control lever 111 and the right control lever 112 at the same time.

The individual cylinder pressures imply cylinder pressures of the boom cylinder 104a, the arm cylinder 105a, and the bucket cylinder 106a, and those pressures are detected by cylinder pressure detectors (not illustrated) disposed on the individual hydraulic cylinders. The swing speed is information representing the swing speed of the upperstructure 102, and is detected by a swing state detector (not illustrated). The swing state detector detects not only the swing speed of the upperstructure 102, but also a swing position and a swing direction.

Figure 5:
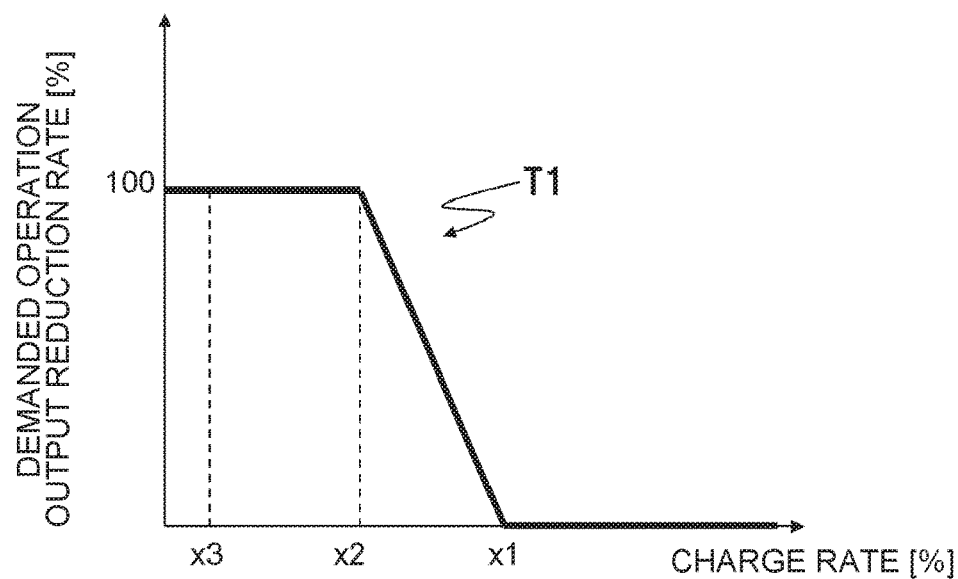
FIG. 5 represents a reduction rate table T1.

As illustrated in FIG. 3, the demanded operation output reduction-rate calculation section 152 calculates a demanded operation output reduction rate on the basis of the charge rate of the electrical storage device 122b, the charge rate being output from the BCU 122a. FIG. 5 represents a reduction rate table T1. A storage device of the controller 150 previously stores the "reduction rate table T1", i.e., a data table indicating a demanded operation output reduction rate with respect to the charge rate of the electrical storage device 122b.

The demanded operation output reduction-rate calculation section 152 refers to the reduction rate table T1 and calculates the demanded operation output reduction rate on the basis of the charge rate of the electrical storage device 122b.

The reduction rate table T1 has characteristics as follows. When the charge rate is not less than a first threshold x1 [%] (e.g., 40 [%]), the demanded operation output reduction rate is 0 [%]. When the charge rate is less than the first threshold x1 [%] and not less than a second threshold x2 [%] (e.g., 35 [%]), the demanded operation output reduction rate linearly increases as the charge rate reduces. When the charge rate is less than the second threshold x2 [%], the demanded operation output reduction rate is 100 [%]. A third threshold x3 [%] corresponds to the charge rate (e.g., 30 [%]) representing a lower limit value for adequate use of the electrical storage device 122b. Thus, when the charge rate gradually reduces from a state in which the charge rate is not less than the first threshold x1 [%], the demanded operation output reduction-rate calculation section 152 sets the demanded output reduction rate to 0 [%] until the charge rate reaches the first threshold x1 [%]. In other words, when the charge rate is not less than the first threshold x1 [%], the output limitation is not performed. When the charge rate is reduced beyond the first threshold x1 [%], the demanded operation output reduction-rate calculation section 152 sets the demanded output reduction rate depending on the reduction of the charge rate. When the charge rate is less than the second threshold x2 [%], the demanded operation output reduction-rate calculation section 152 sets the demanded output reduction rate to 100 [%] (maximum value).

Figure 6:
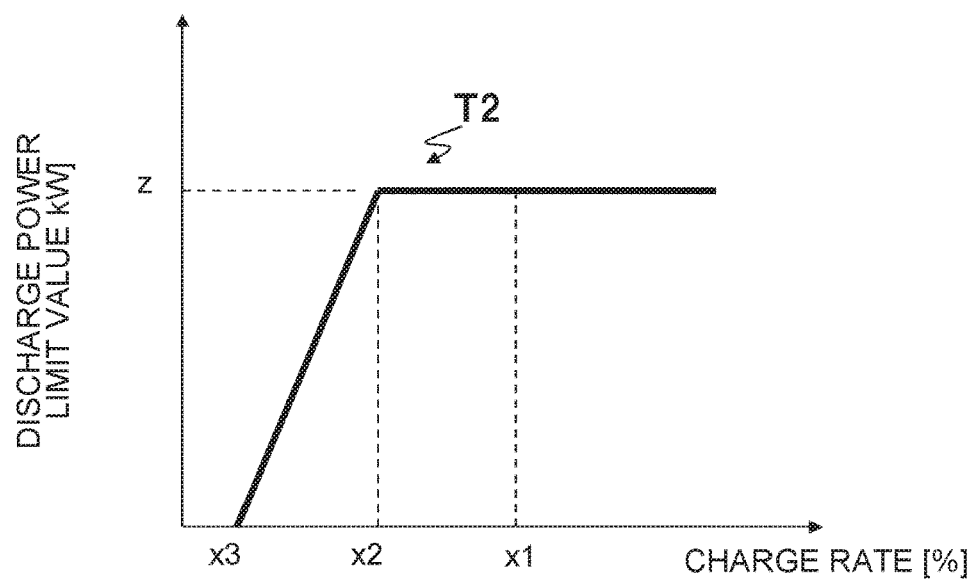
FIG. 6 represents a discharge power limit value table T2.

As illustrated in FIG. 3, the discharge power limit value calculation section 151 calculates a discharge power limit value on the basis of the allowable discharge power output from the BCU 122, and controls discharge power of the electrical storage device 122b. FIG. 6 represents a discharge power limit value table T2. The storage device of the controller 150 previously stores the "discharge power limit value table T2", i.e., a data table indicating a discharge power limit value with respect to the charge rate of the electrical storage device 122b.

The discharge power limit value calculation section 151 refers to the discharge power limit value table T2 and calculates the discharge power limit value on the basis of the charge rate of the electrical storage device 122b.

The discharge power limit value table T2 has characteristics as follows. When the charge rate is not less than a second threshold x2 [%], the discharge power limit value is z [kW]. When the charge rate is less than the second threshold x2 [%] and not less than a third threshold x3 [%], the discharge power limit value linearly reduces as the charge rate reduces. When the charge rate is less than the third threshold x3, the discharge power limit value is 0 [kW]. Here, z [kW] is given as a value almost equal to typical allowable discharge power in the case where the electrical storage device 122b is new and the temperatures of the charge storage elements are at an ordinary temperature. Thus, when the charge rate gradually reduces from a state in which the charge rate is not less than the second threshold x2 [%], the discharge power limit value calculation section 151 sets the discharge power limit value to z [kW] until the charge rate reaches the second threshold x2 [%]. In other words, when the charge rate is not less than the second threshold x2 [%], discharge power limitation is not performed. When the charge rate is reduced beyond the second threshold x2 [%], the discharge power limit value calculation section 151 sets the discharge power limit value to be smaller as the charge rate reduces. When the charge rate is less than the third threshold x3 [%], the discharge power limit value calculation section 151 controls the electrical storage device 122b not to discharge any electric power.

As illustrated in FIG. 3, the output upper limit value calculation section 153 calculates an engine-output upper limit value and an output upper limit value on the basis of the discharge power limit value calculated in the discharge power limit value calculation section 151, the demanded operation output reduction rate calculated in the demanded operation output reduction-rate calculation section 152, the engine target rotational speed that is a command value from the engine control dial (not illustrated), and the individual lever operating amounts.

Figure 7:
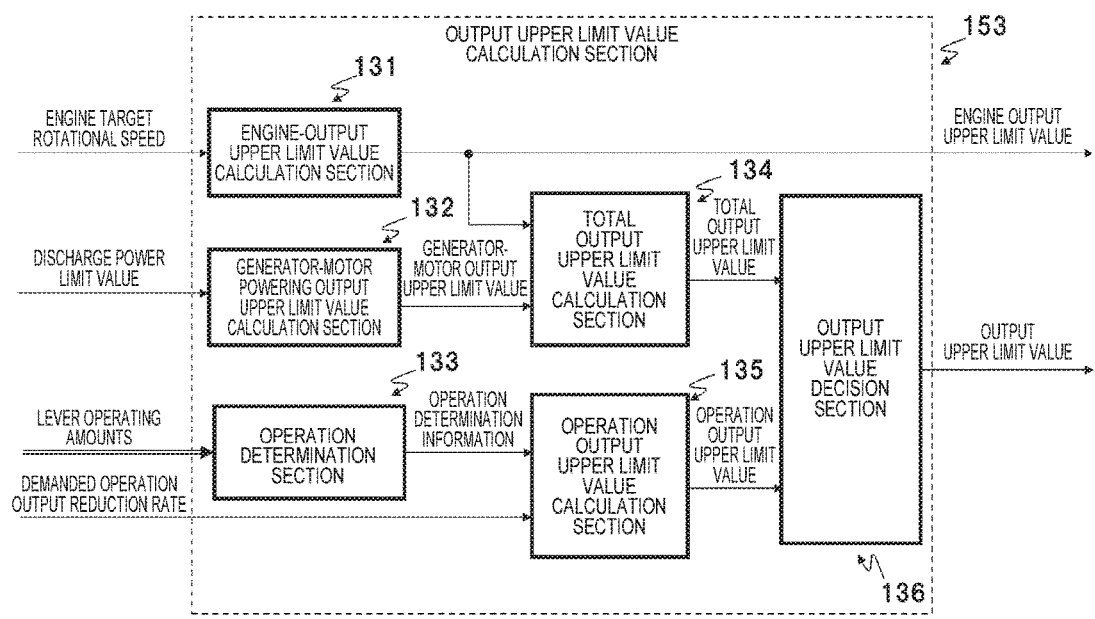
FIG. 7 is a diagram referenced to explain an output upper limit value calculation section in detail.

FIG. 7 is a diagram referenced to explain the output upper limit value calculation section 153 in detail. As illustrated in FIG. 7, the output upper limit value calculation section 153 has functions of an engine-output upper limit value calculation section 131, a generator-motor powering output upper limit value calculation section 132, an operation determination section 133, a total output upper limit value calculation section 134, an operation output upper limit value calculation section 135, and an output upper limit value decision section 136.

The engine-output upper limit value calculation section 131 calculates an output maximum value of the engine 121b, which can be output at the engine target rotational speed, and outputs the calculated output maximum value as an engine-output upper limit value.

The generator-motor powering output upper limit value calculation section 132 calculates, as a generator-motor output upper limit value, an output of the generator motor 123b in a maximum powering mode within a range from 0 [kW] to the discharge power limit value calculated in the discharge power limit value calculation section 151, taking into account hardware-based limitations such as efficiency of the generator motor 123b.

The operation determination section 133 determines the type of operation on the basis of the individual lever operating amounts. When the following condition (i) is satisfied, the operation determination section 133 determines that the excavating operation is performed by the hydraulic excavator 100, and produces, as operation determination information, information representing the "excavating operation".

Condition (i): the arm crowding operating amount is not less than a threshold La, and the bucket crowding operating amount is not less than a threshold Lb.

The thresholds La and Lb are thresholds used to determine whether an arm-crowding operating action is performed and whether a bucket-crowding operating action is performed, respectively, and those thresholds are previously stored in the storage device.

When the following condition (ii) is satisfied, the operation determination section 133 determines that the swing and boom-up operation is performed by the hydraulic excavator 100, and produces, as the operation determination information, information representing the "swing and boom-up operation".

Condition (ii): the left/right swing operating amount is not less than a threshold Lr, and the boom-up operating amount is not less than a threshold Lu.

The thresholds Lr and Lu are thresholds used to determine whether a left/right swing operating action is performed and whether a boom-up operating action is performed, respectively, and those thresholds are previously stored in the storage device.

When the conditions (i) and (ii) are both not satisfied, namely when neither the "excavating operation" nor the "swing and boom-up operation" is performed, the operation determination section 133 determines that the hydraulic excavator 100 does not perform the specific operation, and produces, as the operation determination information, information representing the "other-operation state". The other-operation state includes not only the dumping operation and the swing return operation, but also a work standby state (stopped state).

The total output upper limit value calculation section 134 calculates a total output upper limit value by adding the engine-output upper limit value calculated in the engine-output upper limit value calculation section 131 and the generator-motor output upper limit value calculated in the generator-motor powering output upper limit value calculation section 132. The total output upper limit value is a maximum value that can be output in the present situation of the charge rate of the electrical storage device 122b and the engine rotational speed.

The operation output upper limit value calculation section 135 calculates an operation output upper limit value on the basis of the operation determination information (i.e., information corresponding to one of the "excavating operation", the "swing and boom-up operation", and the "other-operation state"), which is produced from the operation determination section 133, and of the demanded operation output reduction-rate calculated in the demanded operation output reduction-rate calculation section 152.

Figure 8A:
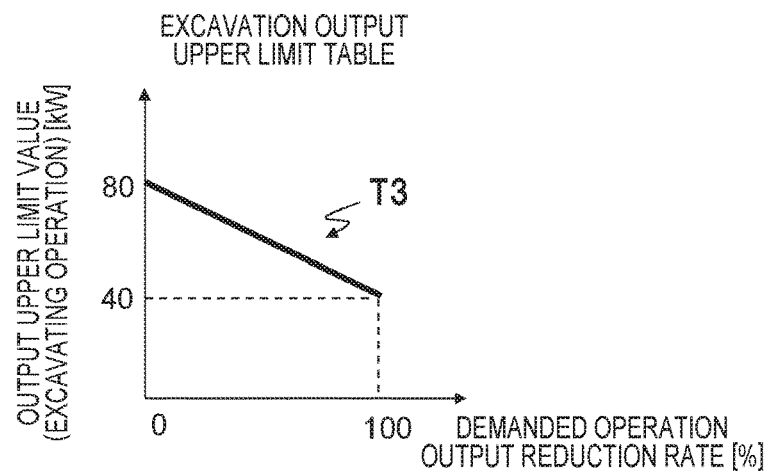
FIG. 8A represents an excavation output upper limit table T3.
Figure 8B:
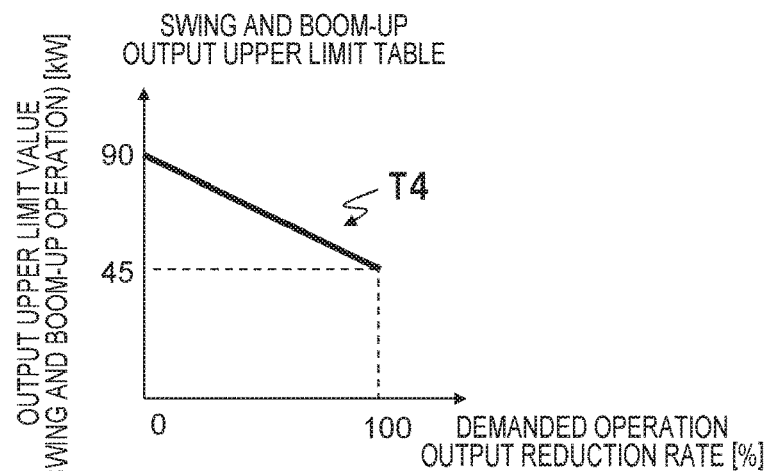
FIG. 8B represents a swing and boom-up output upper limit table T4.
Figure 8C:
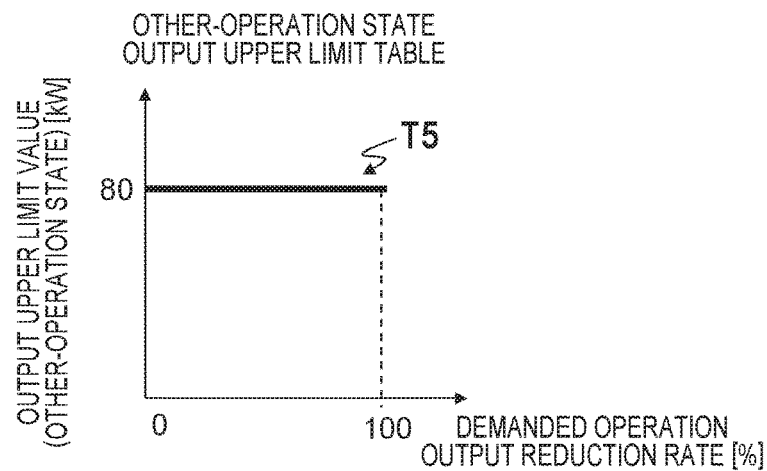
FIG. 8C represents an other-operation state output upper limit table T5.

FIG. 8A represents an excavation output upper limit table T3, FIG. 8B represents a swing and boom-up output upper limit table T4, and FIG. 8C represents an other-operation state output upper limit table T5.

On the basis of the operation determination information, the operation output upper limit value calculation section 135 selects the table corresponding to the relevant operation determination information. More specifically, when the operation determination information is the "excavating operation", the operation output upper limit value calculation section 135 selects the excavation output upper limit table T3 illustrated in FIG. 8A. When the operation determination information is the "swing and boom-up operation", the operation output upper limit value calculation section 135 selects the swing and boom-up output upper limit table T4 illustrated in FIG. 8B. When the operation determination information is the "other-operation state", the operation output upper limit value calculation section 135 selects the other-operation state output upper limit table T5 illustrated in FIG. 8C. In the hydraulic excavator 100 of this embodiment, four operations at maximum can be performed at the same time (in a combined manner) by operating the left control lever 111 and the right control lever 112 at the same time. Thus, when it is determined that the four operations are performed at the same time, the operation output upper limit value calculation section 135 selects the swing and boom-up output upper limit table T4.

The operation output upper limit value calculation section 135 refers to the selected table and calculates the operation output upper limit value on the basis of the demanded operation output reduction rate. In this embodiment, as illustrated in FIGS. 8A and 8B, when the demanded operation output reduction rate is 0 [%], the output upper limit value in the excavating operation is set to 80 [kW] and the output upper limit value in the swing and boom-up operation is set to 90 [kW], taking into account that the swing and boom-up operation is generally a higher-load operation in comparison with the excavating operation. Furthermore, when the demanded operation output reduction rate is 100 [%], the output upper limit value is set to a sufficiently small value such that an average discharge amount and an average charge amount of the electrical storage device 122b are balanced when the above-mentioned sequential cyclic work is performed continuously.

The operation output upper limit value calculation section 135 reduces the output upper limit values at the same rate in the excavating operation and the swing and boom-up operation to ensure that reduction rates of the working speeds corresponding to the reduction of the charge rate are equal to each other in the excavating operation and the swing and boom-up operation. For example, the output upper limit value is reduced such that the output upper limit value at the demanded operation output reduction rate of 100% is 50 [%] of the output upper limit value at the demanded operation output reduction rate of 0%. Thus, as illustrated in FIG. 8A, at the demanded operation output reduction rate of 100 [%], the output upper limit value in the excavating operation is set to 40 [kW] that is a half of the output upper limit value at the demanded operation output reduction rate of 0 [%]. As illustrated in FIG. 8B, at the demanded operation output reduction rate of 100 [%], the output upper limit value in the swing and boom-up operation is set to 45 [kW] that is a half of the output upper limit value at the demanded operation output reduction rate of 0 [%].

In this embodiment, when the low-load operation (i.e., the dumping operation or the swing return operation) in the earth loading work is performed, the output upper limit value is not changed, namely the speed of any of the hydraulic actuators is not reduced, as illustrated in FIG. 8C, even in the case of the charge rate of the electrical storage device 122b becoming lower than the first threshold x1 [%].

In general, it cannot be said that an operation output is perfectly proportional to a speed. However, the speeds of the excavating operation and the swing and boom-up operation can be reduced at the same rate with high accuracy depending on the reduction of the charge rate by tuning the above-described output upper limit tables through actual tests.

As illustrated in FIG. 7, the output upper limit value decision section 136 selects smaller one of the total output upper limit value calculated in the total output upper limit value calculation section 134 and the operation output upper limit value calculated in the operation output upper limit value, and decides the smaller one as the output upper limit value. When the total output upper limit value is smaller than the operation output upper limit value, over-discharge is reliably prevented at the sacrifice of operation performance because the operation is performed, regardless of the determined type of operation, within a total value of the output of the generator motor 123b produced by the discharge power of the electrical storage device 122b and the output that can be supplied by the engine 121b. On the other hand, when the operation output upper limit value is smaller than the total output upper limit value, the operation performance is ensured as far as possible even though the working speed is reduced to prevent over-discharge.

The operation output distribution calculation section 156 illustrated in FIG. 3 calculates an output demanded by each actuator alone on the basis of not only the individual lever operating amounts, the individual cylinder pressures, and the swing speed, but also the output upper limit value calculated in the output upper limit value calculation section 153. A method of calculating each demanded output will be described in detail below.

Figure 9:
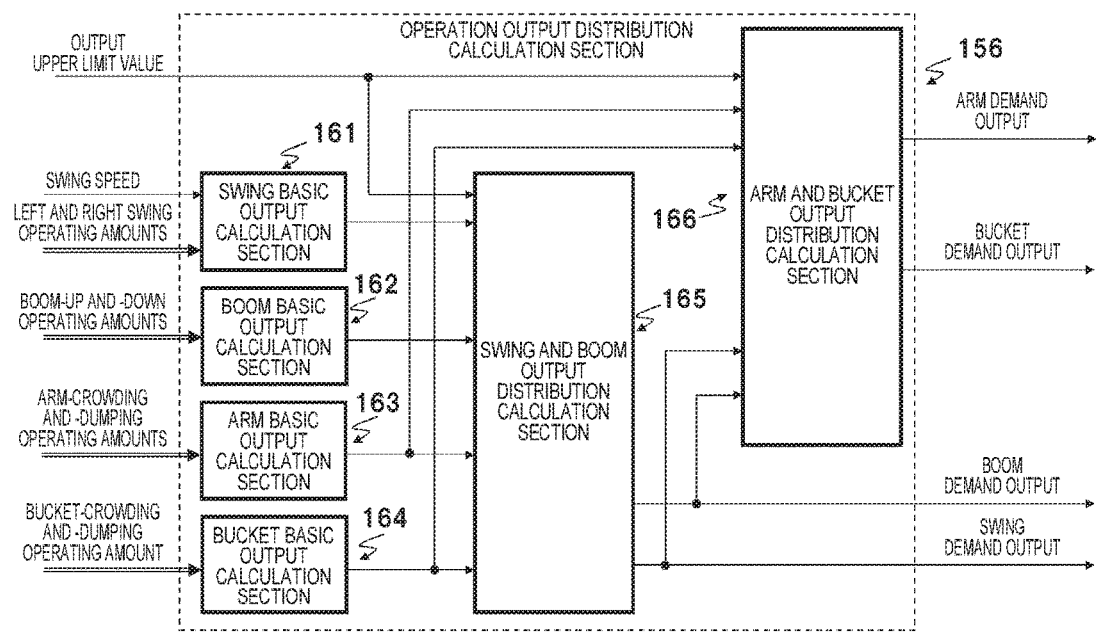
FIG. 9 is a diagram referenced to explain an operation output distribution calculation section in detail.

FIG. 9 is a diagram referenced to explain the operation output distribution calculation section 156 in detail. The operation output distribution calculation section 156 includes a swing basic output calculation section 161, a boom basic output calculation section 162, an arm basic output calculation section 163, a bucket basic output calculation section 164, a swing and boom output distribution calculation section 165, and an arm and bucket output distribution calculation section 166.

Figure 10:
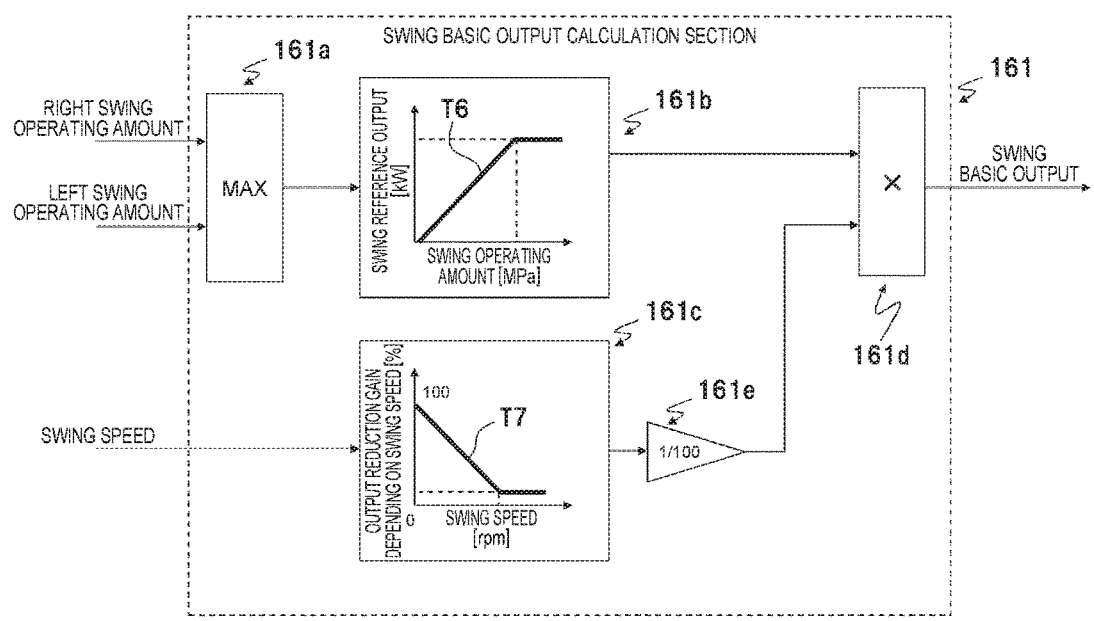
FIG. 10 is a diagram referenced to explain a swing basic output calculation section in detail.

FIG. 10 is a diagram referenced to explain the swing basic output calculation section 161 in detail. As illustrated in FIG. 10, the swing basic output calculation section 161 calculates a swing basic output on the basis of the left swing operating amount given by the left control lever 111, the right swing operating amount, and the swing speed of the upperstructure 102. The swing basic output calculation section 161 includes a left or right swing amount selector 161a, a calculation section 161b, a gain setting section 161c, and a multiplier 161d.

The left or right swing amount selector 161a selects greater one (also simply called a "swing operating amount" hereinafter) of the left swing operating amount and the right swing operating amount.

The storage device of the controller 150 stores a "swing reference output table T6", illustrated in FIG. 10, which is a data table indicating a swing reference output with respect to the swing operating amount. The swing reference output table T6 is tuned so as to provide a necessary and sufficient output when only a swing operating action is made and the swing operation is performed solely. The swing reference output table T6 has characteristics that the swing reference output increases as the swing operating amount (swing operating pilot pressure) increases. The calculation section 161b refers to the swing reference output table T6 and calculates the swing reference output on the basis of the swing operating amount selected in the left or right swing amount selector 161a.

The storage device of the controller 150 stores an "output reduction gain table T7", illustrated in FIG. 10, which is a data table indicating an output reduction gain with respect to the swing speed. As the swing speed increases, a force required to accelerate the upperstructure 102 reduces. The output reduction gain table T7 is tuned so as to monotonously reduce the output reduction gain with respect to an increase of the swing speed, and to provide a good feeling in operating the hydraulic excavator. The gain setting section 161c refers to the output reduction gain table T7 and calculates the output reduction gain on the basis of the swing speed. The calculated output reduction gain [%] is converted to a decimal value by a conversion section 161e, and is multiplied in the multiplier 161d by the swing reference output that has been calculated in the calculation section 161b. A multiplication result is decided as the swing basic output.

Figure 11:
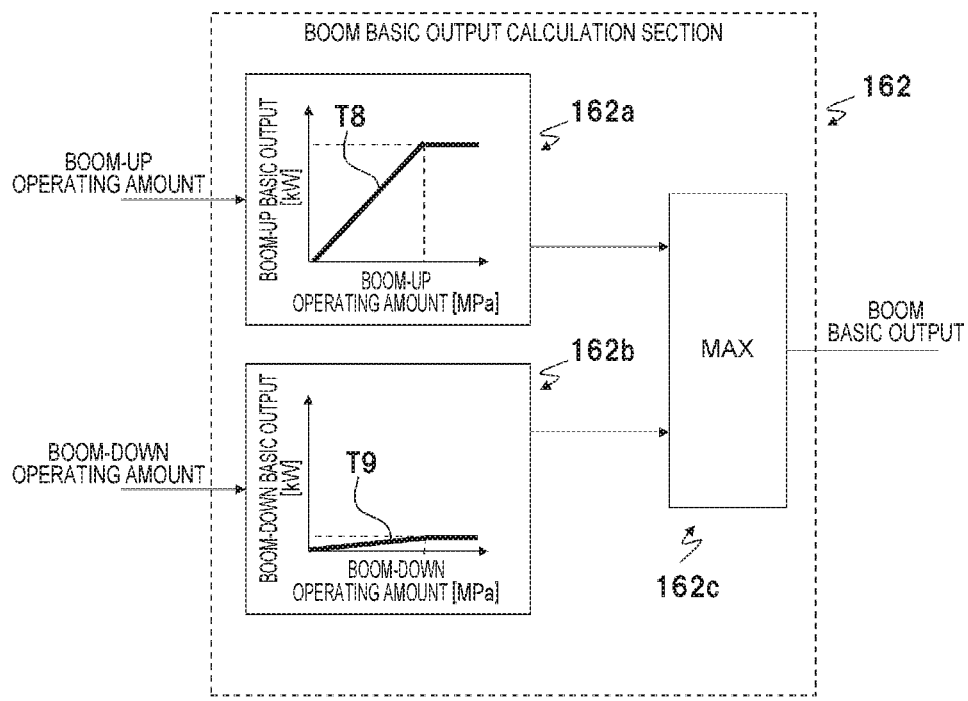
FIG. 11 is a diagram referenced to explain a boom basic output calculation section in detail.

FIG. 11 is a diagram referenced to explain the boom basic output calculation section 162 in detail. The boom basic output calculation section 162 calculates a boom basic output on the basis of the boom-up operating amount and the boom-down operating amount. As illustrated in FIG. 11, the boom basic output calculation section 162 has functions as a boom-up basic output calculation section 162a, a boom-down basic output calculation section 162b, and a maximum value selector 162c.

The storage device of the controller 150 stores a "boom-up basic output table T8", illustrated in FIG. 11, which is a data table indicating a boom-up basic output with respect to the boom-up operating amount. The boom-up basic output table T8 is tuned so as to provide a necessary and sufficient output when only a boom-up operating action is made and the boom-up operation is performed solely. The boom-up basic output table T8 has characteristics that the boom-up basic output increases as the boom-up operating amount (boom-up operating pilot pressure) increases.

The storage device of the controller 150 stores a "boom-down basic output table T9", illustrated in FIG. 11, which is a data table indicating a boom-down basic output with respect to the boom-down operating amount. The boom-down basic output table T9 is tuned so as to provide a necessary and sufficient output when only a boom-down operating action is made and the boom-down operation is performed solely. The boom-down operation can be performed by utilizing the dead weight of the front working device 103. Therefore, the boom-down basic output table T9 has characteristics that the basic output corresponding to the operating amount is smaller than in the boom-up basic output table T8.

The boom-up basic output calculation section 162a refers to the boom-up basic output table T8 and calculates the boom-up basic output on the basis of the boom-up operating amount. Similarly, the boom-down basic output calculation section 162b refers to the boom-down basic output table T9 and calculates the boom-down basic output on the basis of the boom-down operating amount.

The maximum value selector 162c selects, as the boom basic output, greater one of the boom-up basic output calculated in the boom-up basic output calculation section 162a and the boom-down basic output calculated in the boom-down basic output calculation section 162b.

As with the above-described boom basic output calculation section 162, the arm basic output calculation section 163 illustrated in FIG. 9 calculates an arm crowding basic output on the basis of the arm-crowding operating amount, calculates an arm dumping basic output on the basis of the arm-dumping operating amount, and selects, as an arm basic output, greater one of the calculation results. Though not illustrated, the controller 150 stores a data table indicating the arm crowding basic output with respect to the arm-crowding operating amount, and a data table indicating the arm dumping basic output with respect to the arm-dumping operating amount.

As with the above-described boom basic output calculation section 162, the bucket basic output calculation section 164 illustrated in FIG. 9 calculates a bucket crowding basic output on the basis of the bucket-crowding operating amount, calculates a bucket dumping basic output on the basis of the bucket-dumping operating amount, and selects, as a bucket basic output, greater one of the calculation results. Though not illustrated, the controller 150 stores a data table indicating the bucket crowding basic output with respect to the bucket-crowding operating amount, and a data table indicating the bucket dumping basic output with respect to the bucket-dumping operating amount.

Figure 12:
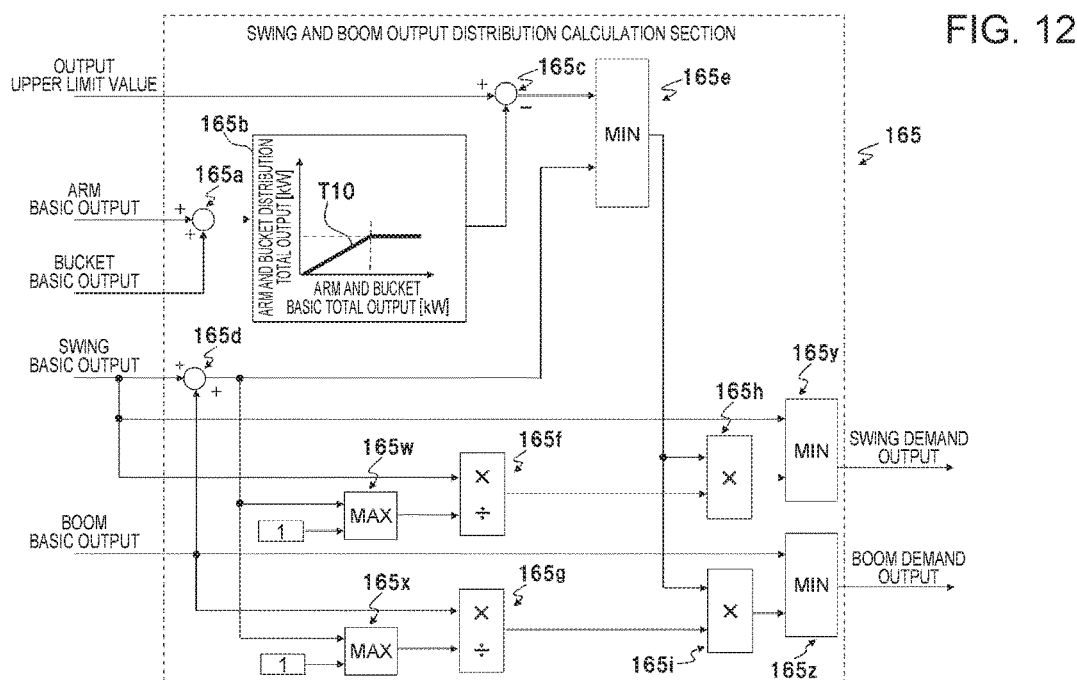
FIG. 12 is a diagram referenced to explain a swing and boom output distribution calculation section in detail.

FIG. 12 is a diagram referenced to explain the swing and boom output distribution calculation section 165 in detail. The storage device of the controller 150 stores an "arm and bucket distribution total output data table T10", illustrated in FIG. 12, which is a data table indicating an arm and bucket distribution total output with respect to an arm and bucket basic total output.

As illustrated in FIG. 12, the swing and boom output distribution calculation section 165 calculates a swing demand output and a boom demand output on the basis of the swing basic output, the boom basic output, the arm basic output, the bucket basic output, and the output upper limit value. The swing and boom output distribution calculation section 165 includes an arm and bucket distribution total output calculation section 165b, minimum value selectors 165e, 165y and 165z, maximum value selectors 165w and 165x, adders 165a and 165d, a subtractor 165c, dividers 165f and 165g, and multipliers 165h and 165i.

The adder 165a adds the arm basic output and the bucket basic output, and decides an arm and bucket basic total output. The arm and bucket distribution total output calculation section 165b refers to the arm and bucket distribution total output data table T10, and calculates an arm and bucket distribution total output on the basis of the arm and bucket basic total output. Thus, an output for the operations of the arm 105 and the bucket 106 is secured in advance.

The subtractor 165c subtracts the arm and bucket distribution total output from the output upper limit value, and decides a swing and boom output upper limit value. The adder 165d adds the swing basic output and the boom basic output, and decides a swing and boom basic total output.

The minimum value selector 165e selects smaller one of the swing and boom output upper limit value and the swing and boom basic total output, and decides the selected one as the swing and boom distribution total output. Thus, when the swing and boom basic total output is greater than the swing and boom output upper limit value, the swing operation and the boom operation are not limited. On the other hand, when the swing and boom basic total output is smaller than the swing and boom output upper limit value, the swing operation and the boom operation are limited.

The divider 165f divides the swing basic output by the swing and boom basic total output, and decides a swing distribution rate. The divider 165g divides the boom basic output by the swing and boom basic total output, and decides a boom distribution rate. Each of the maximum value selectors 165w and 165x compares the basic output with 1, and selects a maximum value between them, thereby preventing a division by zero.

The multiplier 165h multiplies the swing and boom distribution total output by the swing distribution rate. A multiplication result in the multiplier 165h is compared with the swing basic output in the minimum value selector 165y, and smaller one between them is decided as the swing demand output.

The multiplier 165i multiplies the swing and boom distribution total output by the boom distribution rate. A multiplication result in the multiplier 165i is compared with the boom basic output in the minimum value selector 165z, and smaller one between them is decided as the boom demand output.

Figure 13:
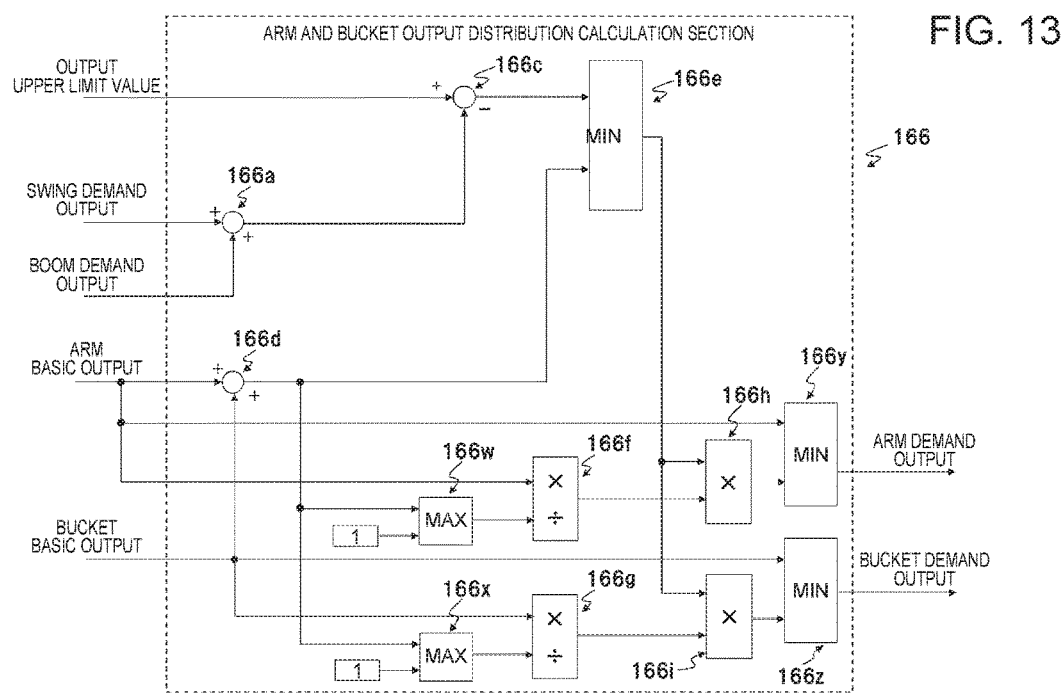
FIG. 13 is a diagram referenced to explain an arm and bucket output distribution calculation section in detail.

FIG. 13 is a diagram referenced to explain the arm and bucket output distribution calculation section 166 in detail. The arm and bucket output distribution calculation section 166 calculates an arm demand output and a bucket demand output on the basis of not only the arm basic output, the bucket basic output, and the output upper limit value, but also the swing demand output and the boom demand output that have been calculated in the swing and boom output distribution calculation section 165.

The arm and bucket output distribution calculation section 166 includes minimum value selectors 166e, 166y and 166z, maximum value selectors 166w and 166x, adders 166a and 166d, a subtractor 166c, dividers 166f and 166g, and multipliers 166h and 166i.

The adder 166a adds the swing demand output and the boom demand output, and decides a swing and boom total demand output. The subtractor 166c subtracts the swing and boom total demand output from the output upper limit value, and decides an arm and bucket output upper limit value. The adder 166d adds the arm basic output and the bucket basic output, and decides the arm and bucket basic total output.

The minimum value selector 166e selects smaller one of the arm and bucket output upper limit value and the arm and bucket basic total output, and decides the selected one as the arm and bucket distribution total output. Thus, when the arm and bucket basic total output is greater than the arm and bucket output upper limit value, the arm operation and the bucket operation are not limited. On the other hand, when the arm and bucket basic total output is smaller than the arm and bucket output upper limit value, the arm operation and the bucket operation are limited. It is to be noted that the arm and bucket distribution total output obtained in the minimum value selector 166e is equal to the arm and bucket distribution total output obtained in the arm and bucket distribution total output calculation section 165b in FIG. 12.

The divider 166f divides the arm basic output by the arm and bucket basic total output, and decides an arm distribution rate. The divider 166g divides the bucket basic output by the arm and bucket basic total output, and decides a bucket distribution rate. Each of the maximum value selectors 166w and 166x compares the basic output with 1, and selects a maximum value between them, thereby preventing a division by zero.

The multiplier 166*h* multiplies the arm and bucket distribution total output by the arm distribution rate. A multiplication result in the multiplier 166*h* is compared with the arm basic output in the minimum value selector 166*y*, and smaller one between them is decided as the arm demand output.

The multiplier 166*i* multiplies the arm and bucket distribution total output by the bucket distribution rate. A multiplication result in the multiplier 166*i* is compared with the bucket basic output in the minimum value selector 166*z*, and smaller one between them is decided as the bucket demand output.

Figure 14:
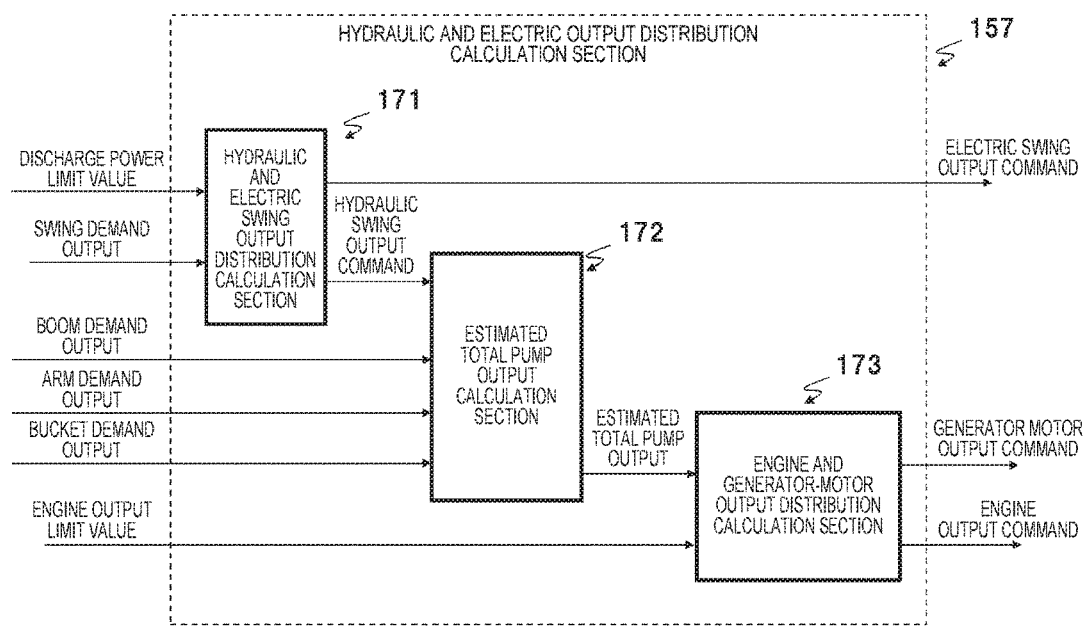
FIG. 14 is a diagram referenced to explain a hydraulic and electric output distribution calculation section in detail.

FIG. 14 is a diagram referenced to explain the hydraulic and electric output distribution calculation section 157 in detail. The hydraulic and electric output distribution calculation section 157 decides an electric swing output command, a generator motor output command, and an engine output command on the basis of the discharge power limit value, the swing demand output, the boom demand output, the arm demand output, the bucket demand output, and the engine-output upper limit value.

The hydraulic and electric output distribution calculation section 157 includes a hydraulic and electric swing output distribution calculation section 171, an estimated total pump output calculation section 172, and an engine and generator-motor output distribution calculation section 173.

The hydraulic and electric swing output distribution calculation section 171 calculates, as a swing and electric-motor powering output upper limit value, an output of the swing electric motor 124*b* when it is in a maximum powering state not exceeding the discharge power limit value, taking into account hardware-based restrictions, such as efficiency of the swing electric motor 124*b*. The hydraulic and electric swing output distribution calculation section 171 compares the swing and electric-motor powering output upper limit value with the swing demand output, and selects and decides smaller one between them as the electric swing output command. When the swing demand output is greater than the swing and electric-motor powering output upper limit value, the hydraulic and electric swing output distribution calculation section 171 sets, as a value of the hydraulic swing output command, a value resulted by subtracting the swing and electric-motor powering output upper limit value from the swing demand output. On the other hand, when the swing demand output is smaller than the swing and electric-motor powering output upper limit value, the hydraulic and electric swing output distribution calculation section 171 sets the value of the hydraulic swing output command to 0.

The estimated total pump output calculation section 172 calculates a total of the hydraulic swing output command, the boom demand output, the arm demand output, and the bucket demand output, and then calculates an estimated total pump output in consideration of the efficiency of the hydraulic pump 126.

The engine and generator-motor output distribution calculation section 173 calculates a difference between the estimated total pump output and the engine-output upper limit value. When the estimated total pump output is greater than the engine-output upper limit value, a value resulted by subtracting the engine-output upper limit value from the estimated total pump output is output as the generator motor output command, i.e., as a powering command, and the engine-output upper limit value is output as the engine output command. On the other hand, when the engine-output upper limit value output is greater than the estimated total pump output, the generator motor output command may be output as a power generation command within a range of the difference between the engine-output upper limit value and the estimated total pump output depending on the charge rate of the electrical storage device 122*b*. At that time, a total value of the estimated total pump output and the generator motor output command (power generation) is given as the engine output command.

The controller 150 further calculates a swing electric torque command, a generator motor torque command, and an engine rotational speed command from the electric swing output command, the generator motor output command, and the engine output command that have been calculated in the above-described series of control procedures. The controller 150 outputs those commands to the first inverter 123*a*, the second inverter 124*a*, the ECU 121*a*, and the BCU 122*a* such that the generator motor 123*b*, the swing electric motor 124*b*, the electrical storage device 122*b*, and the engine 121*b* are controlled to implement the commands.

The following advantageous effects can be obtained with the above-described embodiment.

(1) The controller 150 controls the speed of at least one of the hydraulic actuators depending on the charge rate representing the degree of tendency to deterioration of the electrical storage device 122*b*. When the "excavating operation" and/or the "swing and boom-up operation" defined as predetermined one or more among the plurality of work operations performed by the hydraulic excavator 100 is performed under condition of the degree of tendency to deterioration of the electrical storage device 122*b* becoming higher, namely under condition of the charge rate becoming lower, the controller 150 controls the speed of at least relevant one of the hydraulic actuators to be reduced at a rate preset for the specific operation depending on the degree of tendency to deterioration of the electrical storage device. As a result, reduction of the charge rate can be suppressed, and the lifetime of the electrical storage device 122*b* can be prolonged. According to this embodiment, an odd feeling in operating the hydraulic excavator can be reduced, for example, by selecting, as the specific operation, the work operation that provides a less odd feeling in operating the hydraulic excavator, and by reducing the speed of at least relevant one of the hydraulic actuators for the specific operation. Thus, according to this embodiment, an odd feeling given to the operator in operating the hydraulic excavator can be reduced in comparison with the case of setting the same output upper limit value for all the operations.

(2) The controller 150 refers to the reduction rate table T1 illustrated in FIG. 5, and controls the speeds of the hydraulic actuators to be reduced at the same rate in the "excavating operation" and the "swing and boom-up operation". Thus, since similar speed limitation is performed in both the "excavating operation" and the "swing and boom-up operation" depending on the magnitude of the charge rate, the odd feeling given to the operator in operating the hydraulic excavator can be reduced.

(3) The controller 150 determines, in accordance with the two operating amounts of the left control lever 111 and the right control lever 112, whether the "excavating operation" and/or the "swing and boom-up operation", i.e., the specific operation, is performed. It is hence possible to reliably determine the specific operation, and to perform the appropriate speed reduction. Furthermore, a response in the output limit control can be improved in the case of detecting the operation and the load of the hydraulic actuator to determine whether the specific operation is performed. In other words, when the specific operation is performed, the output can be prevented from temporarily exceeding the limit value.

(4) In this embodiment, the high-load operation is selected as the specific operation. The controller 150 reduces the speed of at least relevant one of the hydraulic actuators when the degree of tendency to deterioration of the electrical storage device 122b reaches the preset threshold and when the high-load operation (i.e., the excavating operation or the swing and boom-up operation) is performed. On the other hand, in the case of the low-load operation (i.e., the dumping operation or the swing return operation) being performed, the controller 150 does not reduce the speed of any of the hydraulic actuators even when the degree of tendency to deterioration of the electrical storage device 122b reaches the preset threshold. Thus, since limitation is made on the high-load operation that greatly affects the discharge amount of the electrical storage device 122b in the earth loading work, the discharge amount of the electrical storage device 122b can be suppressed effectively. Because the low-load operation is not limited, there is a possibility that the operator feels odd when the high-load operation is limited. However, if the operator recognizes that only the high-load operation is limited when the limit control is performed, the odd feeling in operating the hydraulic excavator can be reduced. On the other hand, in the case of setting the same output upper limit value for all the operations, the operator cannot know what type of operation is limited at what timing. This raises a possibility of causing the operator to feel strongly odd in operating the hydraulic excavator.

(5) When the charge rate of the electrical storage device 122b is reduced beyond the preset first threshold x1 [%], the controller 150 reduces the speed of each relevant hydraulic actuator. The first threshold x1 [%] is a value higher than the third threshold x3 [%] that is the lower limit value of the adequate use range of the electrical storage device 122b (i.e., x1>x3). Thus, since the operation speed of each relevant hydraulic actuator is reduced before the charge rate of the electrical storage device 122b deviates from the adequate use range, the charging to and the discharging from the electrical storage device 122b can be prevented from being performed in the state where the charge rate is reduced below the adequate use range. As a result, the lifetime of the electrical storage device 122b can be prolonged.

(6) When the charge rate is reduced beyond the preset first threshold x1 [%], the controller 150 increases the demanded operation output reduction rate (i.e., the reduction rate of the speed of the hydraulic actuator) depending on a degree of the reduction of the charge rate (see FIG. 5). Accordingly, over-discharge of the electrical storage device 122b can be prevented without excessively reducing the operation speed.

(7) When the charge rate of the electrical storage device 122b is reduced beyond the preset second threshold x2 [%] that is set to a value smaller than the first threshold [%], the controller 150 calculates the discharge power limit value on the basis of both the predetermined discharge power limit value table T2 (see FIG. 6) and the charge rate. The controller 150 controls the generator motor 123b, the swing electric motor 124b, and the hydraulic pump 126 such that the discharge power of the electrical storage device 122b does not exceed the discharge power limit value. When the charge rate is reduced beyond the second threshold x2 [%], the discharge power limit value is reduced to suppress the reduction of the charge rate of the electrical storage device 122b regardless of whether the specific operation is performed. Hence the deterioration of the electrical storage device 122b can be suppressed.

(8) The controller 150 sets the discharge power limit value to a smaller value as the charge rate of the electrical storage device 122b reduces further from the preset second threshold x2 [%]. Moreover, when the charge rate of the electrical storage device 122b is reduced beyond the third threshold x3 [%] that is set to a value smaller than the second threshold x2 [%], the controller 150 controls the generator motor 123b, the swing electric motor 124b, and the hydraulic pump 126 such that the electrical storage device 122b does not discharge any electricity. Thus, when the charge rate of the electrical storage device 122b further reduces from the third threshold, the reduction of the charge rate of the electrical storage device 122b can be suppressed, and the deterioration of the electrical storage device 122b can be suppressed.

(9) A smaller-sized engine having a maximum output power smaller than the maximum absorption power of the hydraulic pump 126 is employed as the engine 121b. Therefore, fuel consumption can be reduced. In a hydraulic excavator including the smaller-sized engine, the electrical storage device 122b more frequently repeats charging and discharging than in a hydraulic excavator including a larger-sized engine. Accordingly, the speed limitation of the hydraulic actuator according to this embodiment is performed in a larger number of opportunities, and an effect of reducing the odd feeling in operating the hydraulic actuator is more significant.

The following modifications also fall within the scope of the present invention, and one or more of those modifications may be combined with the above embodiment.

(Modification 1)

While the above embodiment has been described in connection with an example in which, taking the earth loading work as an example, the operation determination section 133 determines three types of operations, i.e., the "excavating operation", the "swing and boom-up operation", and the "other-operation state", and in which the working speeds of the "excavating operation", the "swing and boom-up operation", and the "other-operation state" are limited, the present invention is not limited to that example. Other various types of operations may be determined in consideration of estimated works, for example, in such a manner of determining that the hydraulic excavator 100 performs a leveling operation when the boom-up operating amount and the arm-crowding operating amount are each not less than a certain value, and then producing, as the operation determination information, information representing the "leveling operation". As a result, an operation speed of the leveling operation can be limited.

(Modification 2)

The limit control method described in the above embodiment is one example, and the present invention can be applied to various limit control methods of reducing the speed of at least relevant one of the hydraulic actuators at a rate preset corresponding to the degree of tendency to deterioration of the electrical storage device 122b.

(Modification 3)

While the above embodiment has been described in connection with an example in which the charge rate of the electrical storage device 122b is employed as one example of a deterioration tendency value representing the degree of tendency to deterioration of the electrical storage device 122b, the present invention is not limited to that example. It is known that the deterioration of the electrical storage device 122b including the lithium ion battery is promoted when a high current is input to and output from the electrical storage device 122b in a short time even though the current is within a maximum current value. Thus, if it is found from the past knowledge that the deterioration is promoted on condition of what amount of current being input and output for how long time (seconds), the deterioration of the electrical storage device 122*b* can be suppressed by employing the electrical storage device 122*b* under condition not exceeding the found values of the current and the time. In that case, it is possible not only to prevent the deterioration of the electrical storage device 122*b*, but also to suppress the odd feeling given to the operator in operating the hydraulic excavator by reducing the working speed depending on the status of use of the electrical storage device 122*b* as with the method of limiting the working speed depending on the reduction of the charge rate in the above-described embodiment. Moreover, it is known that the deterioration of the electrical storage device 122*b* is promoted when the temperature of the electrical storage device 122*b* deviates from the adequate use range. In view of the above point, the working speed may be limited by employing the temperature of the electrical storage device 122*b* as the deterioration tendency value, and by determining, on the basis of the temperature of the electrical storage device 122*b*, whether the electrical storage device 122*b* has the tendency to deterioration.

(Modification 4)

While the above embodiment has been described in connection with an example in which the maximum output power of the engine 121*b* is smaller than the maximum absorption power of the hydraulic pump 126, the present invention is not limited to that example. The present invention can be applied to the case where the maximum output power of the engine 121*b* is greater than the maximum absorption power of the hydraulic pump 126.

(Modification 5)

While the above embodiment has been described in connection with an example in which, taking the earth loading work as an example, the "excavating operation" and the "swing and boom-up operation", i.e., the high-load operations, are limited, the present invention is not limited to that example. For instance, in sequential cyclic work including the high-load operation performed momentarily and the low-load operation performed for a long time, only the low-load operation may be limited without limiting the high-load operation. In trying to limit the operation with intent not to reduce the charge rate of the electrical storage device 122*b* when some sequential cyclic work is performed, the specific operation to be limited can be set arbitrarily.

(Modification 6)

While the above embodiment has been described in connection with an example in which the speeds of the hydraulic actuators are reduced at the same rate for two specific operations (i.e., the excavating operation and the swing and boom-up operation) among the plurality of work operations performed by the hydraulic excavator 100, the present invention is not limited to that example. The speeds of the hydraulic actuators may be reduced at the same rate for three or more specific operations. Furthermore, the present invention is not limited to the case where the speeds of the hydraulic actuators are reduced at the same rate for two or more specific operations, and the speeds of the hydraulic actuators may be reduced at different rates for the individual specific operations. As an alternative, the speed of at least relevant one of the hydraulic actuators may be reduced for only one specific operation.

(Modification 7)

While the above embodiment has been described in connection with an example in which the demanded operation outputs are reduced at the same demanded operation output reduction rate for the "excavating operation" and the "swing and boom-up operation", the present invention is not limited to that example. The reduction rate tables may be prepared separately for the "excavating operation" and the "swing and boom-up operation". In that case, characteristics of the reduction rate tables are preferably set such that the operator does not feel odd as if only one of the "excavating operation" and the "swing and boom-up operation" is limited, namely such that the working speeds of the specific operations are reduced at substantially the same rate.

(Modification 8)

While the above embodiment has been described in connection with an example in which lithium ion batteries are incorporated as the charge storage elements in the electrical storage device 122*b*, the present invention can be applied to the case of employing other secondary batteries such as a nickel cadmium battery and a nickel hydrogen battery. Furthermore, the present invention can be applied to a hybrid work machine including an electrical storage device in which an electric double layer capacitor or a lithium ion capacitor is used as the charge storage element.

(Modification 9)

While the above embodiment has been described, by way of example, in connection with the hydraulic excavator 100 that includes the swing electric motor 124*b* driven by at least one of the electric power generated by the generator motor 123*b* and the discharge power of the electrical storage device 122*b*, and the swing hydraulic motor 102*a* driven by the hydraulic oil delivered from the hydraulic pump 126, and that rotationally drives the upperstructure 102 with total torque of the swing electric motor 124*b* and the swing hydraulic motor 102*a*, the present invention is not limited to that example. The present invention can be applied to a hydraulic excavator not including the swing electric motor 124*b*.

(Modification 10)

While the above embodiment has been described, by way of example, in connection with the hybrid hydraulic excavator, the present invention is not limited to that example. The present invention can be applied to various types of hybrid work machines each including the generator motor 123*b* coupled to both the engine 121*b* and the hydraulic pump 126, and the electrical storage device 122*b*. For instance, the present invention may be applied to a hybrid wheel loader that includes an electric motor for traveling, which is driven by the electric power generated by the generator motor 123*b*, in addition to the above-described components, and that includes wheels instead of the above-mentioned crawler type traveling body 101. One example of work performed by the wheel loader is sequential cyclic work of excavating and scooping up earth. Although the excavating operation and the scooping-up operation are the high-load operations, it is general that the scooping-up operation is a higher-load operation in comparison with the excavating operation. When the charge rate of the electrical storage device 122*b* is reduced with repetition of those high-load operations, an odd feeling given to the operator in operating the wheel loader can be suppressed by reducing the operation outputs for both the excavating operation and the scooping-up operation at the same rate.

Although the various embodiments and modifications have been described above, the present invention is not limited to the matters disclosed herein. Other embodiments conceivable within the scope of the technical concept of the present invention are also included within the scope of the present invention.

REFERENCE SIGNS LIST 100 hydraulic excavator (work machine), 101 traveling body, 102 upperstructure, 102a swing hydraulic motor (hydraulic actuator), 104 boom, 104a boom cylinder (hydraulic actuator), 105 arm, 105a arm cylinder (hydraulic actuator), 106 bucket, 106a bucket cylinder (hydraulic actuator), 111 left control lever (operating member), 112 right control lever (operating member), 121b engine, 122b electrical storage device, 123b generator motor, 124b swing electric motor, 126 hydraulic pump, 150 controller (limit control section, operation determination section, and discharge control section)

The invention claimed is:

1. A hybrid work machine comprising an engine, a generator motor driven by the engine, an electrical storage device that supplies and receives electric power to and from the generator motor, a hydraulic pump driven by the engine and the generator motor, hydraulic actuators driven by a hydraulic oil delivered from the hydraulic pump, operating members used to operate the hydraulic actuators, and a controller that controls the hydraulic actuators in accordance with operating amounts of the operating members,
wherein, when a plurality of specific operations defined as predetermined ones among a plurality of work operations performed by the hybrid work machine are performed under condition of a degree of tendency to deterioration of the electrical storage device becoming higher, the controller determines in accordance with the operating amounts of the operating members whether the specific operations are performed, and reduces, in accordance with a determination result, speeds of the hydraulic actuators corresponding to the specific operations at rates preset for the specific operations depending on the degree of tendency to deterioration of the electrical storage device, the rates being the same.

2. The hybrid work machine according to claim 1, wherein the specific operations are high-load operations,
the controller reduces the speeds of relevant ones of the hydraulic actuators when the degree of tendency to deterioration of the electrical storage device reaches a preset threshold and when the high-load operations are performed, and
when a low-load operation subjected to a lower load than the high-load operations is performed, the controller does not reduce the speed of any of the hydraulic actuators even in case that the degree of tendency to deterioration of the electrical storage device reaches the preset threshold.

3. The hybrid work machine according to claim 1, further comprising:
a traveling body;
an upperstructure swingably mounted to the traveling body;
a boom rotatably attached to the upperstructure;
an arm rotatably attached to the boom; and
a bucket rotatably attached to the arm,
wherein the specific operations include at least a swing and boom-up operation in which a swing operation of the upperstructure and an operation of raising the boom are performed at same time, and an excavating operation in which an operation of crowding the arm and an operation of crowding the bucket are performed at same time.

4. The hybrid work machine according to claim 1, wherein the degree of tendency to deterioration of the electrical storage device is represented by a charge rate of the electrical storage device, and
the controller reduces the speeds of relevant ones of the hydraulic actuators when the charge rate of the electrical storage device is reduced beyond a preset threshold.

5. The hybrid work machine according to claim 4, further comprising a discharge control section that controls discharging from the electrical storage device,
wherein the controller reduces the speeds of relevant ones of the hydraulic actuators when the charge rate of the electrical storage device is reduced beyond a preset first threshold and when the specific operations are performed, and
when the charge rate of the electrical storage device is reduced beyond a second threshold that is preset as a value smaller than the first threshold, the controller reduces a limit value of discharge power of the electrical storage device regardless of whether the specific operations are performed.

* * * * *